(12) United States Patent
Rizzetto

(10) Patent No.: US 7,284,631 B2
(45) Date of Patent: Oct. 23, 2007

(54) DRIVE UNIT ABLE TO BE APPLIED TO A VEHICLE PROVIDED WITH PEDALS

(76) Inventor: Cipriano Rizzetto, Via Terraglio, 68, Kolbermoor (IT) 30174

( * ) Notice: Subject to any disclaimer, the term of this patent is extended or adjusted under 35 U.S.C. 154(b) by 41 days.

(21) Appl. No.: 11/060,361

(22) Filed: Feb. 18, 2005

(65) Prior Publication Data

US 2006/0208450 A1     Sep. 21, 2006

(51) Int. Cl.
*B60K 1/00* (2006.01)
*B62M 23/02* (2006.01)
*G05G 1/14* (2006.01)

(52) U.S. Cl. .................. 180/205; 180/206; 180/207; 180/65.2; 74/594.1

(58) Field of Classification Search ............. 180/65.1, 180/65.2, 205–207, 210, 220; 74/594.1–594.3
See application file for complete search history.

(56) References Cited

U.S. PATENT DOCUMENTS 5,845,727 A * 12/1998 Miyazawa et al. .......... 180/205
5,901,807 A *  5/1999 Tseng ......................... 180/206
6,276,479 B1 *  8/2001 Suzuki et al. ............... 180/207

FOREIGN PATENT DOCUMENTS

EP          0968911         1/2000

* cited by examiner

*Primary Examiner*—S. Joseph Morano
*Assistant Examiner*—Marc A. Scharich
(74) *Attorney, Agent, or Firm*—Stevens, Davis, Miller & Mosher, LLP

(57) ABSTRACT

A drive unit able to be applied to a vehicle with pedals, like a bicycle, a tricycle or other, having at least a flywheel and a pair of pedals connected to a central shaft rotatable around a rotation axis. The drive unit comprises an electric motor, fed by an electric feed member, motion transmission members, which connect the electric motor to the flywheel, and a control unit that detects, by means of corresponding sensors, the speed of rotation of the central shaft connected to the pedals in order to feed, in proportion thereto, the electric motor. The drive unit also comprises a first free wheel which connects the motion transmission members to the flywheel, and a second free wheel that connects the central shaft to the flywheel. Both the free wheels are disposed coaxial with the flywheel so as to rotate around the rotation axis.

6 Claims, 2 Drawing Sheets

DRIVE UNIT ABLE TO BE APPLIED TO A VEHICLE PROVIDED WITH PEDALS

FIELD OF THE INVENTION

The present invention concerns a drive unit able to be applied to a vehicle provided with pedals, such as a bicycle, a tricycle, a four-wheeled cycle or suchlike, and also the vehicle provided with said drive unit. In the following text the term bicycle must therefore be taken to mean any vehicle provided with pedals, irrespective of the number of wheels.

The drive unit according to the present invention is governed by the movement of the pedals and is able to automatically transmit motion, which is proportionate to said movement, to at least a toothed crown, or flywheel, of the bicycle. The motion is transmitted by means of very simple and at the same time functional mechanisms, so as to render pedaling as easy and comfortable as possible for the user.

BACKGROUND OF THE INVENTION

A drive unit is known, from the patent application EP-A-0968911, of which the present Applicant is proprietor, in the form of an assembly kit able to be applied on a bicycle, in order to make pedaling comfortable and easy for a user and prevent him from having to make excessive efforts.

The drive unit comprises as its essential parts an electronic control unit, an electric feeder, an electric motor and a motion transmission unit, which connects a flywheel of the bicycle to the electric motor.

The drive unit is also associated with a toothed ringnut that is connected to the pedals and is provided with a sensor able to detect the rotation of the ringnut and send a corresponding signal to the central command unit.

The motion transmission unit substantially comprises a reduction assembly, which is connected by means of a first free wheel to a pinion, in turn connected to a toothed wheel coaxial with the flywheel.

Moreover, a second free wheel is arranged between the pedals and the flywheel of the bicycle in order to render the motion of the latter independent when the motor is in action.

In the known drive unit, the motion transmission unit and the flywheel are not on the same axis of rotation, and hence the pinion and the toothed wheel are connected to each other by means of a transmission chain.

The known drive unit, although very efficient and functional, has the disadvantage that in its entirety it is complex and articulated, and also bulky, due to the misaligned position of the motion transmission unit with respect to the flywheel.

Moreover, it has been observed that the presence of a chain between the pinion and the toothed wheel makes the transmission of motion, as actuated by the electric motor to the flywheel, less easy and smooth.

The present Applicant has devised and embodied this invention to overcome this shortcoming of the state of the art and to obtain other advantages.

SUMMARY OF THE INVENTION

The present invention is set forth and characterized essentially in the main claims, while the dependent claims describe other innovative characteristics of the invention.

Purpose of the invention is to achieve a drive unit able to be applied on a bicycle in order to assist and facilitate pedaling for the user, and wherein the drive unit is simple to construct, as compact in shape as possible and easy to use.

In accordance with this purpose, a drive unit according to the invention is able to be applied on a bicycle having at least a flywheel and a pair of pedals keyed onto a central shaft able to rotate around an axis. The drive unit comprises an electric motor able to be fed by electric feed means, motion transmission means able to connect the electric motor to the flywheel and a control unit able to detect, by means of corresponding sensor means, the speed of rotation of the central shaft in order to feed the electric motor proportionally thereto. A first free wheel is able to connect the transmission means to said flywheel, in order to make the movement of the latter independent when the electric motor is not working, and a second free wheel is able to connect the central shaft with the flywheel, in order to make the movement of the pedals independent when the flywheel is drawn by the motor. According to a characteristic of the present invention, and in accordance with the above purpose, the first free wheel and the second free wheel are arranged coaxial with said flywheel in order to rotate around the same axis, thus allowing to reduce the bulk of the drive unit.

This axial position of the two free wheels also allows to use transmission mechanisms that are simple to make, of limited bulk and easy to assemble.

In one embodiment of the invention, the motion transmission means comprise at least a bevel gear formed by a first pinion, connected to the electric motor, and a bevel wheel that transmits the motion directly to the first free wheel.

According to a variant of said embodiment, the bevel wheel is solid with a second pinion engaging with a toothed wheel that gears down the motion and which is solid and coaxial with the outer zone of the first free wheel.

Instead, the connection between the first free wheel and the flywheel is achieved for example by means of coupling means. On the inner part of the first free wheel at least a front element is attached, arranged radially with respect to the axis of the central shaft and able to be inserted into a mating seating made in the flywheel.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF A PREFERENTIAL FORM OF EMBODIMENT

Figure 1:
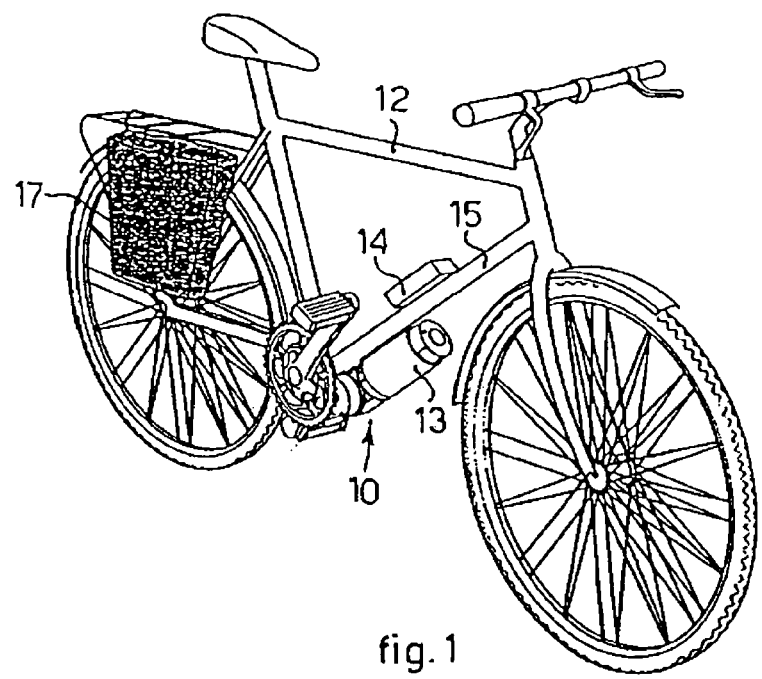
FIG. 1 is a perspective view of a bicycle on which the drive unit according to the present invention is applied.
Figure 2:
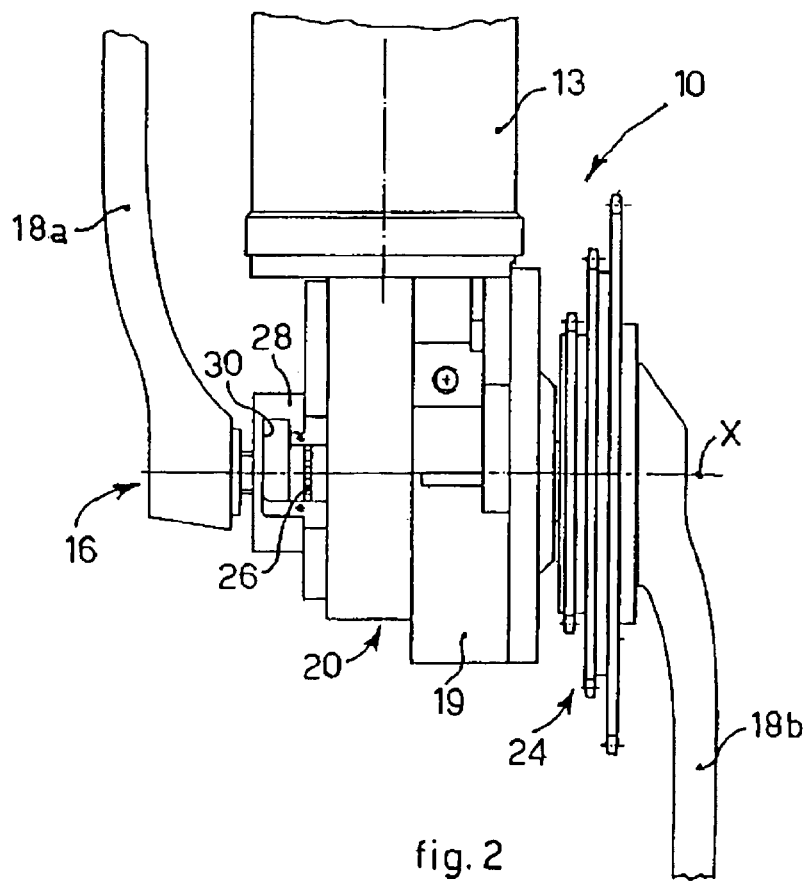
FIG. 2 is a front view of the drive unit in FIG. 1.

With reference to the attached drawings, a drive unit 10 is able to be assembled on a bicycle 12 in order to move it electrically, and is connected to a unit to actuate the motion 16, comprising a first pedal 18a and a second pedal 18b, keyed onto a central shaft 20 that rotates around an axis X.

The drive unit 10 comprises, as essential parts, a feeder 17 comprising accumulators of a known type, an electric motor 13, which is connected to an electronic control unit 14, and a motion transmission unit 22 which is inserted into a box-like protective body 19, and is able to transmit motion from the electric motor 13 to a group of flywheels 24.

The box-like body 19, the pedals 18*a* and 18*b* and the flywheels 24 are made for example of a light alloy, such as aluminum alloy.

The motor 13 is applied on the lower side of the frame 15 of the bicycle 12, so it does not create any hindrance during pedaling, while the electronic control unit 14 can be arranged in any position whatsoever of the frame or handlebars, for example on the upper side of the frame 15, so as to be easily accessible for a user during motion. The control unit 14 is provided with at least a manual switch, not shown in the drawings, to switch the electric motor 13 on or off.

A toothed ringnut 26 is assembled on the central shaft 20, and is arranged inside a covering flange 28 between the first pedal 18*a* and the motion transmission unit 22. An open cavity 30 is also made on the covering flange 28, in which a sensor 27 is able to be fixed, for example of the photo-electric or magnetic type, electrically connected to the control unit 14.

When the electric motor 13 is switched on, the sensor 27 detects the rotation of the toothed ringnut 26 and sends a corresponding signal to the control unit 14, which calculates the speed of rotation and drives the electric motor 13 in proportion thereto.

The motion transmission unit 22 comprises a bevel gear pair formed by a bevel pinion 32 engaging on a bevel wheel 34 and a pinion 36, solid with the wheel 34. The pinion 36 in turn engages with a toothed wheel 40 which is arranged coaxial with the central shaft 20, and is able to further reduce the motion to be transmitted to the flywheels 24.

Between the motion transmission unit 22 and the flywheels 24, according to a characteristic of the present invention, a first free wheel 42 is arranged coaxial with the latter, able to release the flywheels 24 from the motion transmission unit 22, when the bicycle is used in the traditional manner.

In this case, the outer edge 41 of the first free wheel 42 is solid with the toothed wheel 40, while on the inner part 43 of the first free wheel 42 a plurality of coupling front pins 44 are attached, arranged radially equidistant from each other around the axis X and able to be associated with the flywheels 24.

Figure 4:
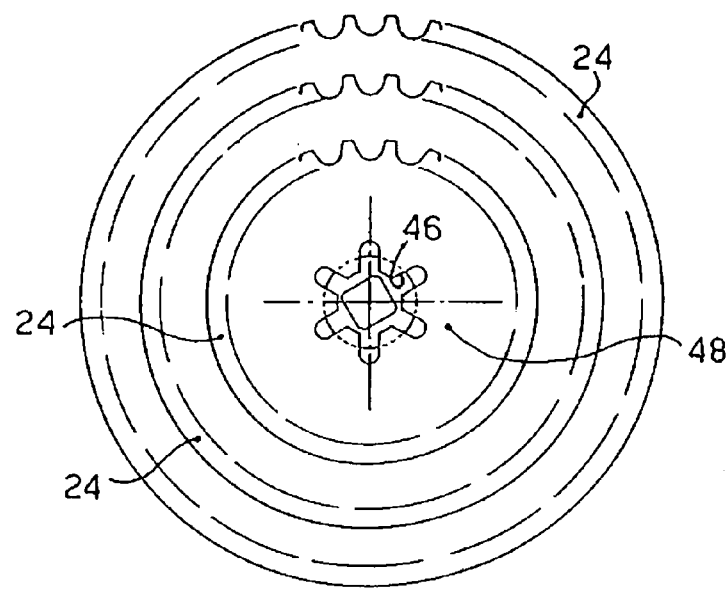
FIG. 4 is a side view of a detail of the drive unit in FIG. 2.
Figure 3:
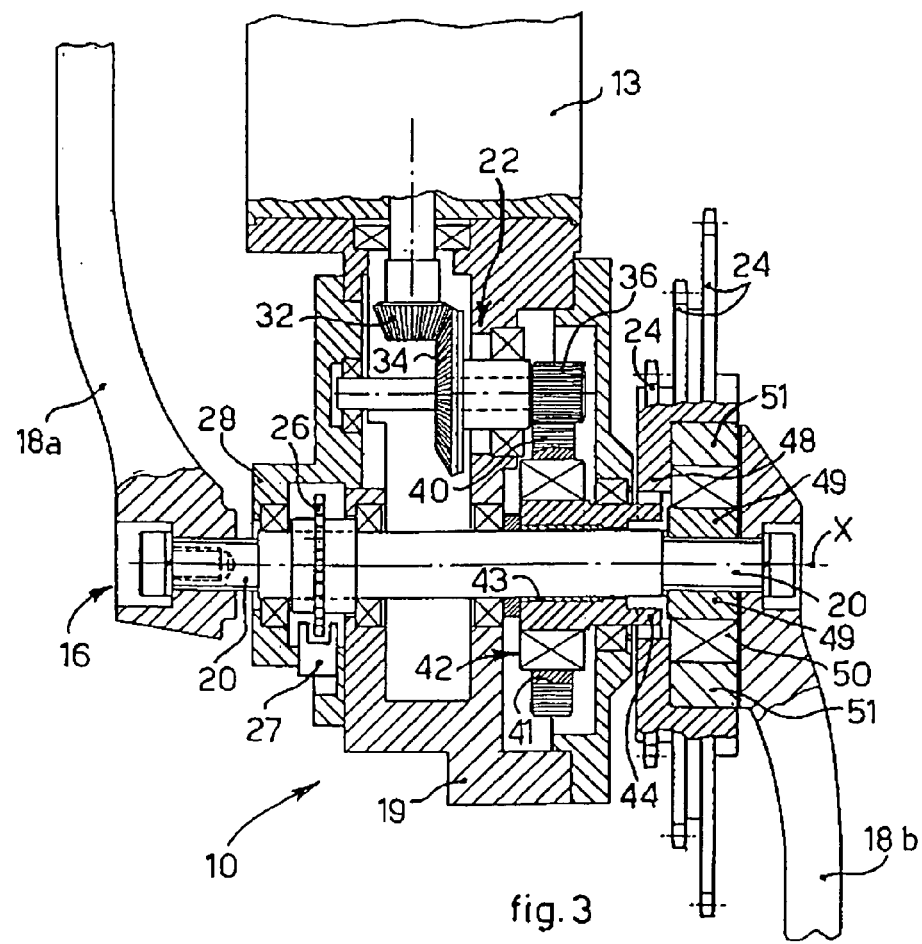
FIG. 3 is a front section of the drive unit in FIG. 2.

To be more exact, the pins 44 are able to be coupled in a seating 46 (FIG. 4), having a star-shaped section, which is made on a flange 48 of the flywheels 24, in order to effect the connection between the latter and the motion transmission unit 22.

The flywheel unit 24 is in turn connected with the second pedal 18*b* by means of a second free wheel 50 which, according to another characteristic of the present invention, is coaxial with the first free wheel 42 and is able to make the motion of the flywheels 24 independent with respect to the motion of the pedals 18*a* and 18*b*, thus creating the possibility of using, or not, the traction supplied by the electric motor 13.

To be more exact, the inner part 49 of the second free wheel 50 is solid with the central shaft 20, while the outer part 51 of the second free wheel 50 is attached to the flywheels 24.

The coaxial position according to the present invention of the two free wheels 42 and 50 and the flywheels 24 solves, advantageously in a simple manner, the complex transmission of motion as effected in the state of the art, and generally allows to compact the drive unit 10 in order thus to reduce its bulk on the bicycle 12.

This coaxial position also allows to simplify the motion transmission unit 22 to only two gear mechanisms, as described above, which are simple to make and allow to further reduce the bulk.

It is clear, however, that modifications and/or additions may be made to the drive unit 10 as described heretofore, without departing from the field and scope of the invention.

It is also clear that, although the present invention has been described with reference to specific examples, a person of skill in the art shall certainly be able to achieve many other equivalent forms of drive unit, all of which shall come within the field and scope of the invention.

The invention claimed is:

1. A drive unit for providing pedalling assistance to a vehicle with pedals including a first pedal and a second pedal keyed to a central shaft for rotating therewith around a rotation axis, and at least one flywheel being rotatable around said rotation axis, said drive unit comprising:
    sensor means for detecting a speed of rotation of said central shaft and of said pedals, and for generating a corresponding signal indicative of the speed of rotation thereof;
    an electric motor having an electric motor shaft rotatably attached thereto;
    a bevel pinion attached to said electric motor shaft;
    a bevel wheel engaged with said bevel pinion;
    feed means for actuating said electric motor to rotate said electric motor shaft and said bevel pinion attached thereto to rotate said bevel wheel engaged with said bevel pinion;
    a control unit connected to said sensor means and to said electric motor, to control a rotation of said electric motor in proportion to said corresponding signal generated by said sensor means;
    a first free wheel, disposed coaxial with said at least one flywheel, for connecting with said at least one flywheel, to functionally connect the at least one said flywheel to said bevel wheel, such that rotation of said bevel wheel rotates said at least one flywheel when said electric motor is actuated by said feed means, and for disconnecting from said at least one flywheel, to functionally disconnect said at least one flywheel from said bevel wheel, when said electric motor is not actuated by said feed means and said vehicle is used in a traditional manner;
    a second free wheel disposed coaxial with said flywheel for connecting said flywheel to said pedals when said electric motor is not actuated by said feed means and said vehicle is used in a traditional manner, and for disconnecting from said flywheel for independent motion of said flywheel with respect to the motion of said pedals and motion of said central shaft when said electric motor is actuated by said feed means.

2. The drive unit as in claim 1, wherein said bevel wheel is solid with a second pinion engaging with a toothed wheel that reduces the motion and which is solid and coaxial with said first free wheel.

3. The drive unit as in claim 1, wherein on the inner part of said first free wheel at least a front element comprising a coupling pin is attached, arranged radially with respect to said rotation axis and able to be inserted into a mating seating made in said flywheel.

4. The drive unit as in claim 1, wherein said sensor means comprises a toothed ringnut keyed to said central shaft near said first pedal and a sensor for sensing rotation of said toothed ringnut, and wherein said flywheel is disposed near said second pedal.

5. A drive unit as in claim 1, wherein said electric motor, said bevel pinion and said bevel wheel are disposed in a substantially central position with respect to said pedals.

6. A pedal vehicle comprising two pedals keyed to a central shaft for rotating therewith around a rotation axis, at least one flywheel being rotatable around said rotation axis under the action of said two pedals, and a drive unit to rotate said flywheel in an alternative of the action of said two pedals, wherein said drive unit comprises:
 sensor means for detecting a speed of rotation of said central shaft and of said pedals, and for generating a corresponding signal indicative of the speed of rotation thereof;
 an electric motor having an electric motor shaft rotatably attached thereto;
 a bevel pinion attached to said electric motor shaft;
 a bevel wheel engaged with said bevel pinion;
 feed means for actuating said electric motor to rotate said electric motor shaft and said bevel pinion attached thereto to rotate said bevel wheel engaged with said bevel pinion;
 a control unit connected to said sensor means and to said electric motor, to control a rotation of said electric motor in proportion to said corresponding signal generated by said sensor means;
 a first free wheel, disposed coaxial with said at least one flywheel, for connecting with said at least one flywheel, to functionally connect the at least one said flywheel to said bevel wheel, such that rotation of said bevel wheel rotates said at least one flywheel when said electric motor is actuated by said feed means, and for disconnecting from said at least one flywheel, to functionally disconnect said at least one flywheel from said bevel wheel, when said electric motor is not actuated by said feed means and said vehicle is used in a traditional manner;
 a second free wheel disposed coaxial with said flywheel for connecting said flywheel to said pedals when said electric motor is not actuated by said feed means and said vehicle is used in a traditional manner, and for disconnecting from said flywheel for independent motion of said flywheel with respect to the motion of said pedals and motion of said central shaft when said electric motor is actuated by said feed means.

* * * * *

UNITED STATES PATENT AND TRADEMARK OFFICE
CERTIFICATE OF CORRECTION

| | |
|---|---|
| PATENT NO. | : 7,284,631 B2 |
| APPLICATION NO. | : 11/060361 |
| DATED | : October 23, 2007 |
| INVENTOR(S) | : Cipriano Rizzetto |

It is certified that error appears in the above-identified patent and that said Letters Patent is hereby corrected as shown below:

On the title page item (76) Inventor, replace "Via Terraglio, 68 - Kolbermoor (IT) 30174" with --Via Terraglio, 68 - 30174 MESTRE (VE) - ITALY--

Signed and Sealed this

Twentieth Day of January, 2009

JON W. DUDAS
*Director of the United States Patent and Trademark Office*